US012637069B2

(12) United States Patent
Miller

(10) Patent No.: US 12,637,069 B2
(45) Date of Patent: May 26, 2026

(54) SYSTEM AND METHOD FOR SUPPRESSION OR ADJUSTMENT OF ACTIONS BY A VEHICLE COLLISION AVOIDANCE SYSTEM

(71) Applicant: Bendix Commercial Vehicle Systems LLC, Avon, OH (US)

(72) Inventor: Justin R. Miller, Elyria, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 67 days.

(21) Appl. No.: 18/628,193

(22) Filed: Apr. 5, 2024

(65) Prior Publication Data

US 2025/0313194 A1     Oct. 9, 2025

(51) Int. Cl.
*B60W 30/09* (2012.01)
*B60W 10/18* (2012.01)
*B60W 30/095* (2012.01)
*B60W 50/14* (2020.01)

(52) U.S. Cl.
CPC ........... *B60W 30/09* (2013.01); *B60W 10/18* (2013.01); *B60W 30/0956* (2013.01); *B60W 50/14* (2013.01); *B60W 2520/06* (2013.01); *B60W 2520/10* (2013.01); *B60W 2554/80* (2020.02)

(58) Field of Classification Search
CPC .. B60W 30/09; B60W 10/18; B60W 30/0956; B60W 50/14; B60W 2520/06; B60W 2520/10; B60W 2554/80; B60W 2050/143; B60W 2540/18; B60W 2554/00; B60W 10/20; B60W 30/0953
See application file for complete search history.

(56) References Cited

U.S. PATENT DOCUMENTS

| | | | |
|---|---|---|---|
| 11,858,501 B2 | 1/2024 | Cho et al. | |
| 2012/0041632 A1* | 2/2012 | Garcia Bordes ...... | B60W 50/14 |
| | | | 701/29.1 |
| 2014/0039786 A1* | 2/2014 | Schleicher ............ | B60W 10/04 |
| | | | 701/301 |
| 2017/0106857 A1* | 4/2017 | Nasser .................. | B60W 30/09 |
| 2021/0237719 A1 | 8/2021 | Chen et al. | |

FOREIGN PATENT DOCUMENTS

KR        20200002231 A  *  1/2020  ......... B60R 21/0134

OTHER PUBLICATIONS

Machine Translation of Junghoon's reference (KR-20200002231-A) (Year: 2020).*

* cited by examiner

*Primary Examiner* — Tarek Elarabi
(74) *Attorney, Agent, or Firm* — Reising Ethington P.C.

(57) ABSTRACT

A vehicle collision avoidance system includes a collision sensor that generates a collision signal indicative of an object in a path of travel of the vehicle. A controller identifies a first side of the vehicle containing a blind spot for an operator of the vehicle. The controller further identifies a potential collision between the vehicle and the object responsive to the collision sensor and the speed of the vehicle and the trajectory of the vehicle. The controller suppresses, or adjusts one or more conditions for, generation of a control signal relating to the potential collision if the vehicle speed and trajectory meet predetermined conditions and the potential collision would occur on a second side of the vehicle opposite the first side of the vehicle.

20 Claims, 2 Drawing Sheets

SYSTEM AND METHOD FOR SUPPRESSION OR ADJUSTMENT OF ACTIONS BY A VEHICLE COLLISION AVOIDANCE SYSTEM

BACKGROUND OF THE INVENTION a. Field of the Invention

This disclosure relates to collision avoidance systems for vehicles. In particular, this disclosure relates to a system and method for suppressing or adjusting actions intended to warn a vehicle operator of a potential collision and/or assist or assume operation of a vehicle in response to a potential collision in situations where the potential collision is, in fact, unlikely to occur and could create a distraction for the vehicle operator.

b. Background Art

Modern vehicles often include a collision avoidance system that is designed to assist an operator of the vehicle in avoiding collisions between the vehicle and other objects including other vehicles, pedestrians and road infrastructure. When the system determines that a collision may occur, the system may generate control signals for one or more operator interfaces to warn the vehicle operator and allow the operator to take evasive action to avoid the collision. The system may also generate control signals for one or more vehicle control systems such as the vehicle braking system or vehicle steering system to assist the operator in, or assume control over, operation of the vehicle to avoid the collision.

In certain conditions, the collision avoidance system may identify potential collisions where an actual collision is unlikely to occur. For example, in locations with a large number of nearby objects such as a narrow city street, the system may continuously identify a large number of potential collisions when actual collisions are unlikely to occur. In particular, a vehicle operator will often need to execute frequent steering changes that are likely to briefly introduce objects in the path of travel for the vehicle, but which are unlikely to result in actual collisions as the operator continues to maneuver the vehicle. In such conditions, warnings and/or corrective actions by the collision avoidance system may create an unwanted distraction for the vehicle operator that decreases operator satisfaction with the vehicle and may also negatively impact the operator's ability to properly operate the vehicle.

The inventor herein has recognized a need for a system and method for suppressing nuisance actions by a collision avoidance system that will minimize and/or eliminate one or more of the above-identified deficiencies.

BRIEF SUMMARY OF THE INVENTION

This disclosure relates to collision avoidance systems for vehicles. In particular, this disclosure relates to a system and method for suppressing or adjusting actions intended to warn a vehicle operator of a potential collision and/or assist or assume operation of a vehicle in response to a potential collision in situations where the potential collision is, in fact, unlikely to occur and could create a distraction for the vehicle operator.

An embodiment of a collision avoidance system for a vehicle includes a collision sensor configured to generate a collision signal indicative of an object in a path of travel of the vehicle. The system further includes a controller configured to identify a first side of the vehicle containing a blind spot for an operator of the vehicle. The controller is further configured to identify a potential collision between the vehicle and the object responsive to the collision signal, determine a speed of the vehicle, and determine a trajectory of the vehicle. The controller is further configured to suppress, or adjust a condition for, generation of a control signal relating to the potential collision if the speed of the vehicle meets a first predetermined condition relative to a predetermined speed, the trajectory of the vehicle meets a second predetermined condition relative to a predetermined trajectory and the potential collision would occur on a second side of the vehicle opposite the first side of the vehicle.

An embodiment of an article of manufacture includes a non-transitory computer storage medium having a computer program encoded thereon that, when executed by a controller of a collision avoidance system for a vehicle, suppresses or adjust certain actions by the collision avoidance system. The computer program includes code for identifying a first side of the vehicle containing a blind spot for an operator of the vehicle. The computer program further includes code for identifying a potential collision between the vehicle and an object in a path of travel of the vehicle responsive to a collision signal generated by a collision sensor. The computer program further includes code for determining a speed of the vehicle and determining a trajectory of the vehicle. The computer program further includes code for suppressing, or adjusting a condition for, generation of a control signal relating to the potential collision if the speed of the vehicle meets a first predetermined condition relative to a predetermined speed, the trajectory of the vehicle meets a second predetermined condition relative to a predetermined trajectory and the potential collision would occur on a second side of the vehicle opposite the first side of the vehicle.

An embodiment of a method for suppressing or adjusting certain actions by a collision avoidance system of a vehicle includes identifying a first side of the vehicle containing a blind spot for an operator of the vehicle. The method further includes identifying a potential collision between the vehicle and an object in a path of travel of the vehicle responsive to a collision signal generated by a collision sensor. The method further includes determining a speed of the vehicle and determining a trajectory of the vehicle. The method further includes suppressing, or adjusting a condition for, generation of a control signal relating to the potential collision if the speed of the vehicle meets a first predetermined condition relative to a predetermined speed, the trajectory of the vehicle meets a second predetermined condition relative to a predetermined trajectory and the potential collision would occur on a second side of the vehicle opposite the first side of the vehicle.

A collision avoidance system for a vehicle and a method for suppressing nuisance actions by a collision avoidance system of a vehicle in accordance with the teachings disclosed herein is advantageous relative to conventional systems and methods. In particular, the system and method suppress, or adjust conditions for, actions, such as warnings to the vehicle operator and/or assisted or automated control of vehicle braking and steering systems, in response to detection of a potential collision by the system in situations where the potential collision is unlikely to actually occur and/or can be easily avoided by the vehicle operator. As a result, the operator will encounter fewer distractions leading to improved operator satisfaction and performance.

The foregoing and other aspects, features, details, utilities, and advantages of the present teachings will be apparent from reading the following description and claims, and from reviewing the accompanying drawings.

DETAILED DESCRIPTION OF THE INVENTION

Figures 1, 2, 3:
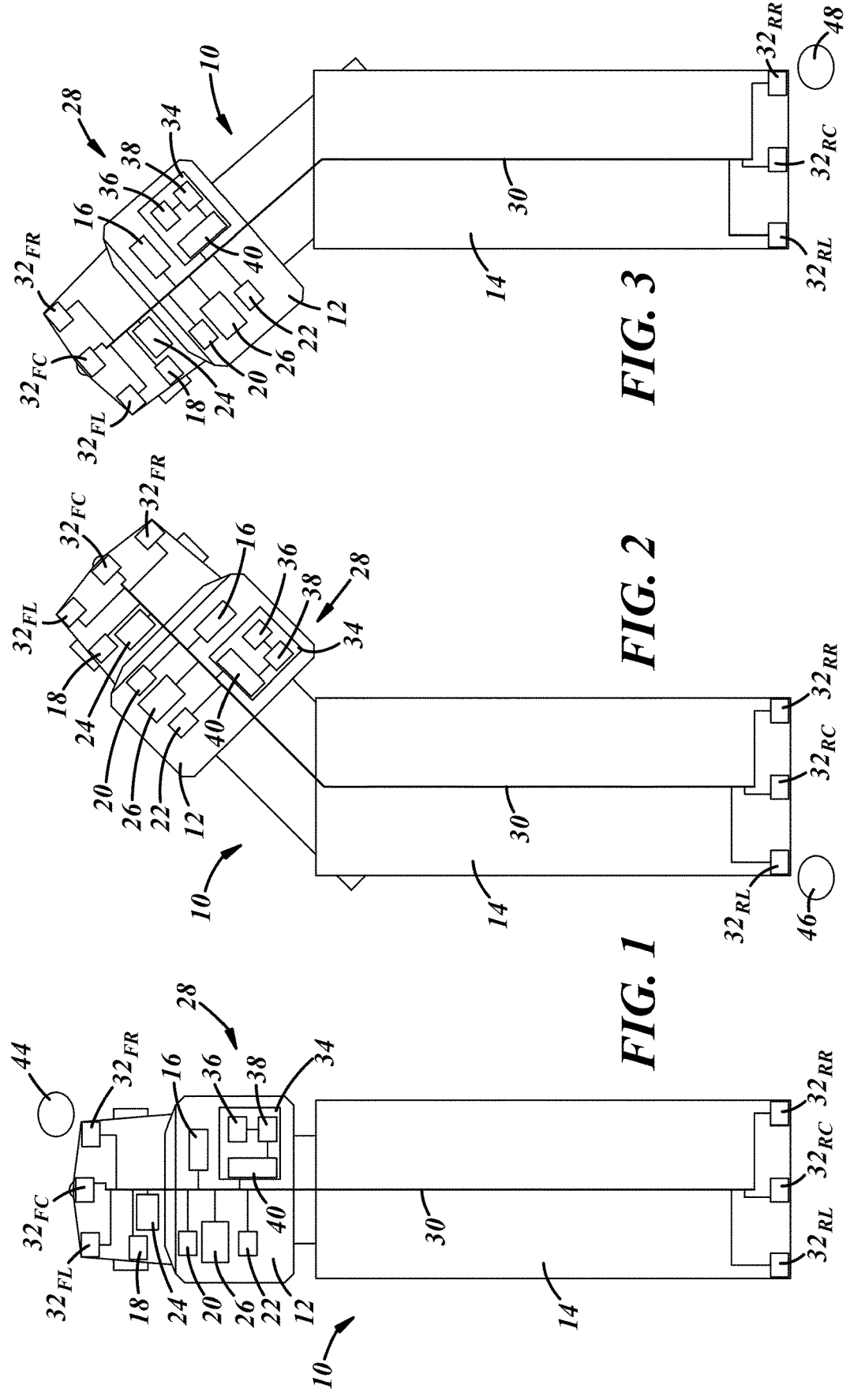
FIGS. 1-3 are diagrammatic views of a vehicle including one embodiment of a collision avoidance system in accordance with the teachings set forth herein.

Referring now to the drawings wherein like reference numerals are used to identify identical components in the various views, FIGS. 1-3 illustrate a vehicle 10. In the illustrated embodiment, vehicle 10 comprises a commercial vehicle and, in particular, a tractor-trailer. It should be understood, however, that the systems and methods disclosed herein may find application on other types of commercial vehicles such as buses and in non-commercial vehicles. Vehicle 10 includes a towing member or tractor 12 and a towed member or semi-trailer 14. Vehicle 10 may further include an operator interface 16, various sensors for sensing conditions associated with the operation of vehicle 10 and its operating environment including a speed sensor 18, a steer angle sensor 20 and a yaw rate sensor 22, and various control systems for controlling the operation of vehicle 10 and components of vehicle 10 in response to commands from an operator of vehicle 10 or as part of an advanced driver assistance system (ADAS) or automated driving system (ADS) including a brake control system 24, a steering control system 26 and, in accordance with the teachings herein, a collision avoidance system 28.

Tractor 12 provides power for moving semi-trailer 14. Tractor 12 includes steering and drive axles each of which support one or more wheels at either end. Tractor 12 further includes a power unit, such as an internal combustion engine or electric motor for generating mechanical energy used to rotate the wheels and a battery that provides electrical energy for use in starting the power unit and, in embodiments where the power unit includes an electric motor, for use by the power unit in generating the mechanical energy used to drive the wheels. The battery may also provide power to various accessory systems on vehicle 10.

Semi-trailer 14 is provided to carry or store freight and is detachably coupled to tractor 12. Although a single semi-trailer 14 is shown in the illustrated embodiment, it should be understood that the number of semi-trailers attached to tractor 12 may vary. Semi-trailer 14 is supported on one or more trailer axles, each of which may support one or more wheels at either end.

Operator interface 16 provides an interface between the vehicle operator and various sensors and systems on vehicle 10 through which the operator can receive information about vehicle 10 and its surrounding environment and control certain vehicle functions. In accordance with the teachings herein, interface 16 may, for example, provide warnings to the operator regarding potential collisions between vehicle 10 and other objects (e.g., other vehicles, pedestrians and road infrastructure) identified by collision avoidance system 28. Interface 16 may be mounted within the cabin of tractor 12 and, in particular, on the dashboard of tractor 12. Interface 16 may include light emitters, such as light emitting diodes, sound emitters, such as a speaker, and/or haptic actuators to convey visual, audio and/or haptic messages to the vehicle operator. In the case of visual alerts, different information can be conveyed through differences in color, differences in intensity, differences in the number of lights, and differences in the pattern of activation of the lights. In the case of audio alerts, different information can be conveyed through differences in the type of sound generated, differences in volume and differences in the pattern of sounds. In the case of haptic alerts, different information can be conveyed through differences in the length, intensity or pattern of vibration. It should be understood that the form of operator interface 16 may vary depending on the information that is conveyed through interface 16 and the vehicle functions controlled through interface 16. Interface 16 may, for example, include mechanical actuators and/or a touch screen display with a graphical user interface (GUI). Interface 16 may communicate with various sensors and systems on vehicle 10, including collision avoidance system 28, in a variety of ways including over dedicated wires or other conductors or over a conventional vehicle communications bus 30 implementing a communications network such as a controller area network (CAN) or local interconnect network (LIN) or over a vehicle power line through power line communication (PLC) in accordance with various industry standard protocols including by not limited to SAE J1939, SAEJ1922, and SAE J2497 or a proprietary protocol.

Speed sensor 18 is provided to generate a speed signal indicative of the speed of vehicle 10. Sensor 18 may, for example, comprise a wheel speed sensor configured to output a signal indicative of the rotational speed of a wheel on vehicle 10. Alternatively, sensor 18 may comprise an engine or transmission speed sensor configured to output a signal indicative of the rotational speed of an engine or transmission shaft on vehicle 10.

Steer angle sensor 20 is provided to generate a steer angle signal indicative of the steer angle of vehicle 10. Sensor 20 may generate a signal indicative of the rotational position of a member of a steering column on vehicle 10 such as a steering wheel or a steering shaft coupled to the steering wheel.

Yaw rate sensor 22 is provided to generate a yaw rate signal indicative of an angular velocity of vehicle 10 about a vertical or yaw axis of the vehicle 10. Sensor 22 may comprise a piezoelectric or micromechanical sensor.

It should be understood that, in addition to sensors 18, 20, 22, vehicle 10 may include a variety of sensors for sensing conditions associated with the operation of vehicle 10 and the surrounding environment for vehicle 10 including, for example, pressure sensors for sensing fluid pressures in brake control system 24 and load sensors. The sensors on vehicle 10, including sensors 18, 20,22, may communicate with other systems and components on vehicle 10, including operator interface 16, brake control system 24, steering control system 26 and collision avoidance system 28, over communication bus 30.

Brake control system 24 is configured to brake one or more wheels on vehicle 10 in order to slow, stop or prevent movement of vehicle 10. System 24 may be configured to brake vehicle 10 in response to commands from an operator of vehicle 10, but may also be configured to implement autonomous braking (i.e., without commands from the operator of the vehicle) as part of an advanced driver assistance system (ADAS) or automated driving system (ADS) in order to provide various functions such as automated emergency braking (AEB), anti-lock braking (ABS), collision avoidance, adaptive cruise control, traction control or stability control. System 24 may include one or more wheel brakes (which may comprise, for example, disc brakes or drum brakes) associated with one or more wheels on vehicle 10, a fluid circuit that generates and transmits fluid pressure to the wheel brakes, sensors, such as sensors 18, 20, 22, that identify various conditions associated with the vehicle and the surrounding environment and that impact braking of the vehicle, an operator interface, such as operator interface 16 for inputting operator commands relating to braking of vehicle 10 and outputting information (e.g., warnings) regarding braking of vehicle 10 and one or more controllers for controlling the operation of system 24.

Steering control system 26 is configured to control the steering of vehicle 10. System 26 may be configured to steer vehicle 10 in response to commands from an operator of vehicle 10, but may also be configured to implement autonomous steering (i.e., without commands from the operator of the vehicle) as part of an advanced driver assistance system (ADAS) or automated driving system (ADS) in order to provide various functions such as collision avoidance, lane keep assistance, and parking assistance. System 26 may include a steering column configured to receive steering forces input from an operator of vehicle 10 (through, for example, a steering wheel), a power steering system that transfers and augments forces input by the vehicle operator through the steering column to a steering gear, and a steering linkage that translates movement of the steering gear into corresponding movement of the steerable wheels on vehicle 10. Steering system 26 may further include sensors, such as sensors 18, 20, 22, that identify various conditions associated with the vehicle and the surrounding environment and that impact steering of the vehicle, an operator interface, such as operator interface 16 for inputting operator commands relating to steering of vehicle 10 and outputting information (e.g., warnings) regarding steering of vehicle 10 and one or more controllers for controlling the operation of system 26.

It should be understood that, in addition to systems 24, 26, vehicle 10 may include a variety of systems for controlling the operation of vehicle 10. The systems on vehicle 10, including systems 24, 26, may communicate with other systems and components on vehicle 10, including operator interface 16, speed sensor 18, steer angle sensor 20, yaw rate sensor 22 and collision avoidance system 28, over communication bus 30.

Collision avoidance system 28 is provided identify potential collisions between vehicle 10 and other objects (e.g., other vehicles, pedestrians or road infrastructure) and to generate warnings regarding the potential collisions and/or control signals to assist or control the operation of vehicle 10 to avoid the collisions. System 28 may include a plurality of collision sensors 32 and a controller 34.

Collision sensors 32 are provided to identify objects (e.g., other vehicles, pedestrians or road infrastructure) within a defined field of view and provide information regarding the object including, for example, the presence of the object within the field of view, the position or location of the object within the field of view and the distance between the object and vehicle 10. Sensors 32 may comprise radar (radio detection and ranging) sensors, lidar (light detection and ranging) sensors, cameras or other types of sensors. Sensors $32_{FL}$, $32_{FC}$, and $32_{FR}$ are located at the front of tractor 12 and identify objects in a forward path of travel of vehicle 10. In the illustrated embodiment, sensors $32_{FL}$, $32_{FC}$, and $32_{FR}$ are mounted on a front bumper of vehicle 10, but one or more of sensors $32_{FL}$, $32_{FC}$, and $32_{FR}$ may be mounted, for example, on the windshield of vehicle 10. Sensors $32_{RL}$, $32_{RC}$, and $32_{RR}$ are located on the rear of trailer 14 and identify objects in a rearward path of travel of vehicle 10. It should be understood that similar sensors 32 could be located at other locations on vehicle 10 including on the sides of vehicle 10 and may be used for a variety of purposes including blind spot monitoring, lane departure warning and lane change assist systems and parking assist systems. Each sensor 32 generates signals indicative of objects within the field of view of the sensor 32 and transmits those signals to controller 34.

Controller 34 is provided to process information from collision sensors 32 and other vehicle sensors (such as sensors 18, 20, 22) and systems and to generate warnings to the operator of vehicle 10 regarding potential collisions and/or to assist the operator in controlling vehicle 10 or assume operation of vehicle 10 to avoid potential collisions. Controller 34 may comprise a programmable microprocessor or microcontroller or may comprise an application specific integrated circuit (ASIC). Controller 34 may include a memory 36 and a central processing unit (CPU) 38. Controller 34 may also include an input/output (I/O) interface 40 including a plurality of input/output pins or terminals through which controller 34 may receive a plurality of input signals and transmit a plurality of output signals. The input signals may, for example, include signals received from speed sensor 18, steer angle sensor 20, yaw rate sensor 22 and collision sensors 32. The output signals may, for example, include signals transmitted to operator interface 16, brake control system 24 and/or steering control system 26. Controller 34 may be configured to communicate with one or more components or systems of vehicle 10 including operator interface 16, sensors 18, 20, 22, 32, and systems 24, 26 over bus 30.

Figure 4:
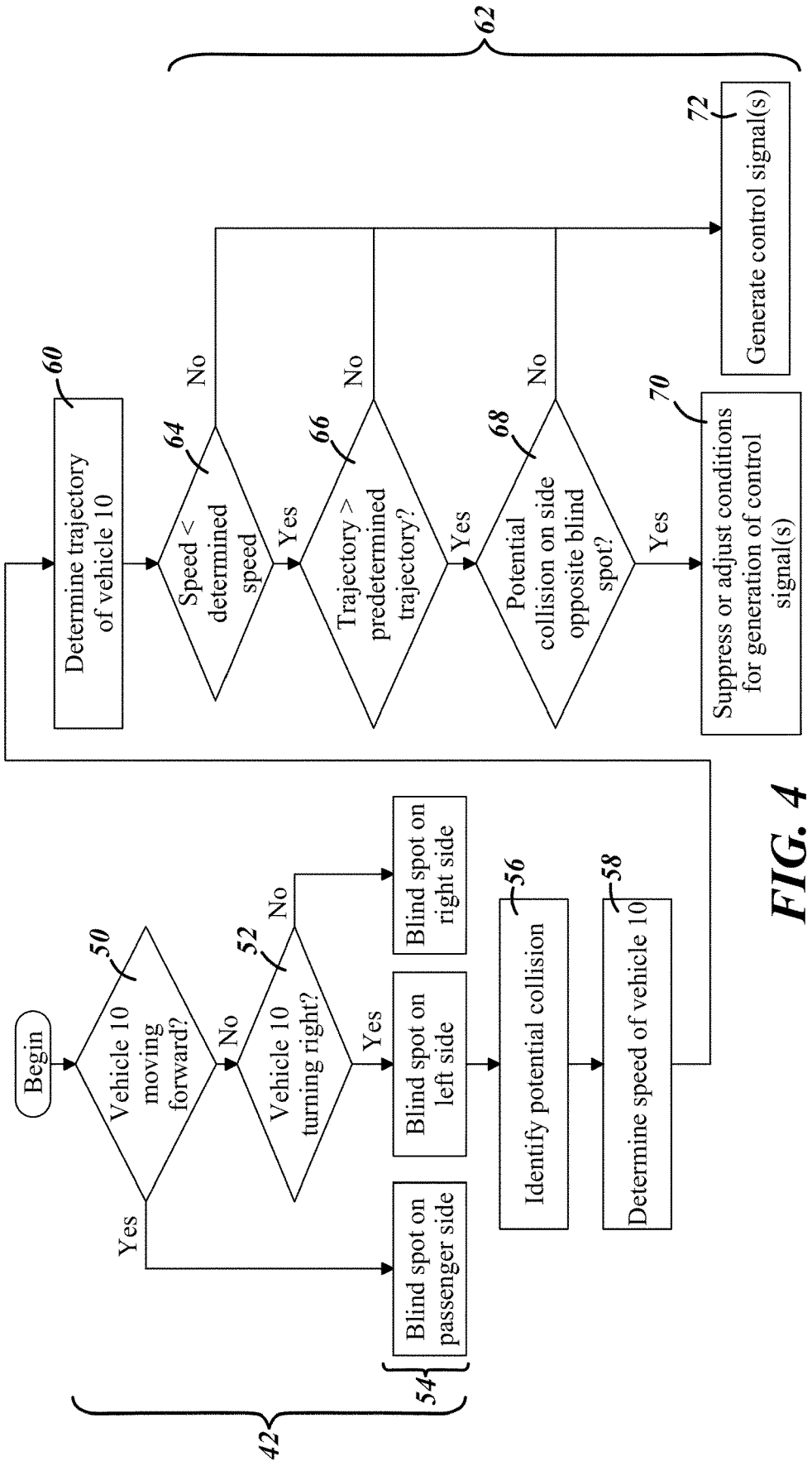
FIG. 4 is a flow chart diagram illustrating several steps in one embodiment of a method for suppressing nuisance actions by a collision avoidance system of a vehicle in accordance with the teachings set forth herein.

Referring now to FIG. 4, controller 34 may be configured with appropriate programming instructions (i.e., software or a computer program) to implement various steps in a method for suppressing and/or adjusting actions by collision avoidance system 28 in vehicle 10. The method may begin with the step 42 of identifying a first side of vehicle 10 containing a blind spot for an operator of vehicle 10. The location of blind spots on vehicle 10, and particularly the side of vehicle 10 where certain blind spots are located, may be dependent on the direction of travel of vehicle 10. Referring to FIG. 1, when vehicle 10 is traveling in a forward direction (whether in a straight line or turning), a significant blind spot 44 exists near the front of vehicle 10 on the side of vehicle 10 opposite where the operator of vehicle 10 is located (i.e., on what is often referred to as the passenger side of vehicle 10). In the illustrated embodiment, the operator is located on the left side of vehicle 10 and blind spot 44 is located on the right side of vehicle 10. In embodiments where the operator is located on the right side of vehicle 10, blind spot 44 will be located on the left side of vehicle 10. Referring to FIGS. 2-3, when vehicle 10 is traveling in a backwards direction (i.e., in reverse) and is turning, for example, to park or position vehicle 10 for unloading, a significant blind spot 46 (FIG. 2) or 48 (FIG. 3) exists near the rear of vehicle 10 on the side of the vehicle 10 opposite the steering direction of vehicle 10. Referring to FIG. 2, when vehicle 10 is traveling backwards and the vehicle is being steered to the right, articulation of tractor 12 and trailer 14 will allow the operator to see the rear of vehicle 10 on the right side, but a blind spot 46 will exist near the rear of vehicle 10 on the left side of vehicle 10. Conversely, and referring to FIG. 3, when vehicle 10 is travelling backwards and is being steered to the left, articulation of tractor 12 and trailer 14 will allow the operator to see the rear of vehicle 10 on the left side, but a blind spot 48 will exist near the rear of vehicle 10 on the right side of vehicle 10.

Referring again to FIG. 4, in performing step 42 controller 34 may determine, in substep 50, the direction of travel of vehicle 10. Controller 34 may determine the direction of travel of vehicle 10 responsive to, for example, the position of a gear shift actuator (e.g., a lever or push button) in vehicle 10 as indicated by a gear shift actuator position sensor, the speed signal generated by speed sensor 20 (where the speed signal also conveys the direction of rotation of the wheel or shaft) or the output of another control system on vehicle 10. In some embodiments, controller 34 may further determine a steering direction of vehicle 10. In the illustrated embodiment, for example, if controller 34 determines in substep 50 that vehicle 10 is moving in a backwards direction, controller 34 will then determine the steering direction of vehicle 10 in substep 52. Controller 34 may determine the steering direction of vehicle 10 responsive to a steering signal generated by steer angle sensor 20 or a yaw rate signal generated by yaw rate sensor 22. Based on the direction of travel of vehicle 10 and, when traveling backwards, the steering direction of vehicle 10, controller 34 will, in substep 54, classify the left or right side of vehicle 10 (relative to the forward direction of vehicle travel) as the side having a blind spot 44, 46, 48. For example, if controller 34 determines that vehicle 10 is traveling in a forward direction, controller 34 may, in substep 54, classify the passenger side of vehicle 10 (which may be the left or right side of the vehicle depending on where the operator is positioned) as the side having a blind spot 44. If controller 34 determines that vehicle 10 is traveling in a backwards direction, controller 34 may, in substep 54, classify the side of vehicle 10 opposite the steering direction of vehicle 10 as the side having a blind spot 46 or 48.

The method may continue with the step 56 of identifying a potential collision between vehicle 10 and an object in a path of travel of vehicle 10. Controller 34 may identify a potential collision responsive to a collision signal generated by one of collision sensors 32 indicating that an object is within the field of view of the sensor 32. When vehicle 10 is traveling in a forward direction, controller 34 may identify potential collisions in the fields of view of sensors $32_{FL}$, $32_{FC}$, and $32_{FR}$. When vehicle 10 is traveling in a backwards direction controller 34 may identify potential collisions in the fields of view of sensors $32_{RL}$, $32_{RC}$, and $32_{RR}$. Controller 34 can identify the particular sensor 32 generating a collision signal through conventional communication protocol techniques including, for example, unique addressing for each sensor 32.

The method may continue with the steps 58, 60 of determining a speed of vehicle 10 and a trajectory of vehicle 10. Controller 34 may determine the speed of vehicle 10 responsive to signals generated by speed sensor 18. Controller 34 may determine the trajectory of vehicle 10 responsive to signals generated by steer angle sensor 20 and/or yaw rate sensor 22. Controller 34 may receive a speed signal indicative of the speed of vehicle 10 directly from speed sensor 18 or indirectly from another system on vehicle 10. Similarly, controller 34 may receive a steer angle signal and/or a yaw rate signal indicative of a trajectory of vehicle 10 directly from steer angle sensor 20 and yaw rate sensor 22, respectively, or indirectly from another system on vehicle 10.

The method may continue with the step 62 of determining, based on the speed of vehicle 10, the trajectory of vehicle 10 and the side of vehicle 10 where the potential collision will occur, whether to generate and transmit one or more control signals to, for example, warn the vehicle operator of the potential collision and/or assist the vehicle operator or assume control of vehicle 10 to avoid the potential collision. Step 62 may include several substeps 64, 66, 68 and 70 or 72.

In substep 64, controller 34 determines whether the speed of vehicle 10 meets a predetermined condition relative to a predetermined speed. When vehicle 10 is traveling at relatively low speeds, there is a greater likelihood that vehicle 10 is moving through an area, such as a narrow city street, with a relatively large number of objects increasing the likelihood that collision avoidance system 28 will generate a false positive that a collision is likely to occur. Furthermore, when travelling at relatively low speeds, the vehicle operator is better able to identify potential collisions without the assistance of system 28. For these reasons, it may be desirable to suppress, or adjust conditions for generation of, control signals that would result in warnings to the operator, assistance to the operator, or control of vehicle 10 when the vehicle is moving at relatively low speeds. Therefore, the predetermined condition may be that the speed of vehicle 10 is less than, or less than or equal to, a predetermined speed or an offset from a predetermined speed. If the speed of vehicle 10 meets the predetermined condition relative to the predetermined speed, the method may proceed to substep 66. Otherwise, the method proceeds to substep 72.

In substep 66, controller 34 determines whether the trajectory of vehicle 10 meets a predetermined condition relative to a predetermined trajectory. When the steer angle and/or yaw rate for vehicle 10 is relatively large, there is a greater likelihood that vehicle 10 is moving through an area, such as a narrow city street, where significant maneuvering of vehicle 10 is required. The maneuvering of vehicle 10 will briefly bring objects into the fields of view of sensors 32 again increasing the likelihood that collision avoidance system 28 will generate a false positive that a collision is likely to occur. Furthermore, significant movement of vehicle 10 is likely to indicate that the vehicle operator is already taking steps to avoid potential collisions without the assistance of system 28. For these reasons, it may again be desirable to suppress, or adjust conditions for generation of, control signals that would result in warnings to the operator, assistance to the operator, or control of vehicle 10 when the steer angle and/or yaw rate of vehicle 10 is relatively large. Therefore, the predetermined condition may be that one or both of the steer angle and yaw rate of vehicle 10 are greater than, or greater than or equal to, a predetermined steer angle and predetermined yaw rate, respectively, or an offset from a predetermined steer angle or predetermined yaw rate, respectively. If the steer angle and/or yaw rate of vehicle 10 meets the predetermined condition relative to the predetermined steer angle and/or predetermined yaw rate, the method may proceed to substep 68. Otherwise, the method proceeds to substep 72.

In substep 68, controller 34 determines whether the potential collision would occur on a side of vehicle 10 opposite the side having the blind spot 44, 46 or 48 identified in step 42. When the potential collision, as indicated by the collision signal from a collision sensor 32, would occur on a side that does not contain the blind spot 44, 46 or 48 for the operator, the operator is better able to avoid potential collisions without the assistance of system 28. For this reason, it may again be desirable to suppress, or adjust conditions for generation of, control signals that would result in warnings to the operator, assistance to the operator, or control of vehicle 10 if the potential collision will occur on a side of vehicle 10 that does not contain a blind sport 44, 46 or 48 for the vehicle operator. If the potential collision would occur on a side of vehicle 10 that does not contain a blind spot 44, 46 or 48 for the vehicle operator, the method may proceed to substep 70. Otherwise, the method proceeds to substep 72.

In substep 70, controller 34 suppresses, or adjusts one or more conditions for, generation of any control signals that are intended to warn the operator of vehicle 10 of a potential collision or to assist the operator or control vehicle 10 to avoid a potential collision. In particular, controller 34 will have identified a set of conditions—a relatively low speed for vehicle 10, a relatively large steer angle and/or yaw rate for vehicle 10, and a collision that would occur in the operator's line of sight—that render an actual collision unlikely. Under these circumstances, warnings to the vehicle operator or active assistance of control of vehicle 10 may create unwanted distractions for the vehicle operator that will decrease operator satisfaction with system 28 and operator performance. In some embodiments, controller 34 may therefore suppresses generation of control signals when the speed of vehicle 10 meets a predetermined condition relative to a predetermined speed (e.g., is less than the predetermined speed), the trajectory of vehicle 10 meets a predetermined condition relative to a predetermined trajectory (e.g., the steer angle and/or yaw rate is greater than the predetermined steer angle and/or predetermined yaw rate), and the potential collision would occur on a side of vehicle 10 opposite the side containing the blind spot 44, 46 or 48 identified in step 42. In other embodiments, controller 34 may adjust one or more conditions for generation of control signals when the speed of vehicle 10 meets a predetermined condition relative to a predetermined speed (e.g., is less than the predetermined speed), the trajectory of vehicle 10 meets a predetermined condition relative to a predetermined tra-jectory (e.g., the steer angle and/or yaw rate is greater than the predetermined steer angle and/or predetermined yaw rate), and the potential collision would occur on a side of vehicle 10 opposite the side containing the blind spot 44, 46 or 48 identified in step 42. For example, controller 34 may be configured to generate control signals intended to warn the operator of vehicle 10 of a potential collision when the object in within a first distance (e.g., 4 meters) from vehicle 10 and to generate control signals intended to assist the operator or control vehicle 10 to avoid a potential collision (e.g., through control of braking system 24 or steering system 26) when the object is within a second distance (e.g., 2 meters), less than the first distance, from vehicle 10. If controller 34 identifies a set of conditions—a relatively low speed for vehicle 10, a relatively large steer angle and/or yaw rate for vehicle 10, and a collision that would occur in the operator's line of sight—that render an actual collision unlikely, controller 34 may adjust the distances that would otherwise trigger generation of control signals. Controller 34 may for example, decrease the sensitivity of the system by reducing the distances at which a control signal is generated (e.g., to 3 meters and 1 meter, respectively, in the example given above). In some embodiments, controller 34 may adjust the conditions for generation of control signals for potential collisions on only one side of vehicle 10. If controller 34 identifies a set of conditions—a relatively low speed for vehicle 10, a relatively large steer angle and/or yaw rate for vehicle 10, and a collision that would occur in the operator's line of sight—that render an actual collision unlikely, controller 34 may, for example, reduce the dis-tances necessary to trigger generation of control signals on the side without a blind spot 44, 46, 48, increase the distances that result in generation of control signals on the side with a blind sport 44, 46, 48 or both.

If, on the other hand, the speed of vehicle 10 does not meet the predetermined condition relative to the predeter-mined speed, the trajectory of vehicle 10 does not meet the predetermined condition relative to the predetermined tra-jectory, or the potential collision will occur on the side of vehicle 10 containing the blind spot 44, 46 or 48, controller 34 will, in substep 72, generate one or more control signals in response to the collision signal from sensor 32 configured to warn the vehicle operator of the potential collision and/or to assist the operator in controlling vehicle 10 or assume control of vehicle 10 to avoid the potential collision. Con-troller 34 may, for example, generate one or more control signals configured to cause operator interface 16 to issue a visual, audio, and/or haptic warning to the vehicle operator to alert the vehicle operator to the potential collision. Alter-natively, or in addition, controller 34 may generate one or more control signals configured to cause brake control system 24 to apply or release one or more wheel brakes of vehicle 10, steering control system 26 to adjust the steer angle of vehicle 10, or another vehicle control system to either assist the operator or assume control of vehicle 10 from the operator to avoid the potential collision.

A collision avoidance system 28 for a vehicle 10 and a method for suppressing nuisance actions by a collision avoidance system 28 of a vehicle 10 in accordance with the teachings disclosed herein is advantageous relative to con-ventional systems and methods. In particular, the system 28 and method suppress, or adjust conditions for, actions, such as warnings to the vehicle operator and/or assisted or automated control of vehicle braking and steering systems 24, 26, in response to detection of a potential collision by the system 28 in situations where the potential collision is unlikely to actually occur and/or can be easily avoided by the vehicle operator. As a result, the operator will encounter fewer distractions leading to improved operator satisfaction and performance.

While the invention has been shown and described with reference to one or more particular embodiments thereof, it will be understood by those of skill in the art that various changes and modifications can be made without departing from the spirit and scope of the invention.

What is claimed is:

1. A collision avoidance system for a vehicle, comprising:
   a collision sensor configured to generate a collision signal indicative of an object in a path of travel of the vehicle;
   a controller configured to
      identify a first side of the vehicle containing a blind spot for an operator of the vehicle;
      identify a potential collision between the vehicle and the object responsive to the collision signal;
      determine a speed of the vehicle;
      determine a trajectory of the vehicle; and
      suppress generation of a control signal relating to the potential collision if the speed of the vehicle meets a first predetermined condition relative to a predeter-mined speed, the trajectory of the vehicle meets a second predetermined condition relative to a prede-termined trajectory and the potential collision would occur on a second side of the vehicle opposite the first side of the vehicle, wherein the control signal assists or automates control of a braking system of the vehicle and/or steering system of the vehicle in response to detection of the potential collision.

2. The system of claim 1 wherein the controller is further configured, when identifying the first side of the vehicle containing the blind spot, to determine a direction of travel of the vehicle.

3. The system of claim 2 wherein the controller is further configured, when identifying the first side of the vehicle containing the blind spot, to classify a passenger side of the vehicle as the first side of the vehicle when the direction of travel of the vehicle is forward.

4. The system of claim 2 wherein the controller is further configured, when identifying the first side of the vehicle containing the blind spot, to classify a side of the vehicle opposite a steering direction of the vehicle as the first side of the vehicle when the direction of travel of the vehicle is backward.

5. The system of claim 1 wherein the control signal is configured to communicate a warning to the operator of the vehicle through an operator interface on the vehicle.

6. The system of claim 1 wherein the control signal is configured to activate an advanced driver assistance system on the vehicle.

7. The system of claim 6 wherein the advanced driver assistance system comprises an emergency braking system.

8. The braking system of claim 1 wherein the condition comprises a distance between the object and the vehicle.

9. An article of manufacture, comprising:

a non-transitory computer storage medium having a computer program encoded thereon that, when executed by a controller of a collision avoidance system for a vehicle, suppresses or adjusts certain actions by the collision avoidance system, the computer program including code for:

identifying a first side of the vehicle containing a blind spot for an operator of the vehicle;

identifying a potential collision between the vehicle and an object in a path of travel of the vehicle responsive to a collision signal generated by a collision sensor;

determining a speed of the vehicle;

determining a trajectory of the vehicle; and suppressing generation of a control signal relating to the potential collision if the speed of the vehicle meets a first predetermined condition relative to a predetermined speed, the trajectory of the vehicle meets a second predetermined condition relative to a predetermined trajectory and the potential collision would occur on a second side of the vehicle opposite the first side of the vehicle, wherein the control signal assists or automates control of a braking system of the vehicle and/or steering system of the vehicle in response to detection of the potential collision.

10. The article of manufacture of claim 9 wherein the code for identifying the first side of the vehicle containing the blind spot includes code for determining a direction of travel of the vehicle.

11. The article of manufacture of claim 10 wherein the code for identifying the first side of the vehicle containing the blind spot includes code for classifying a passenger side of the vehicle as the first side of the vehicle when the direction of travel of the vehicle is forward.

12. The article of manufacture of claim 10 wherein the code for identifying the first side of the vehicle containing the blind spot includes code for classifying a side of the vehicle opposite a steering direction of the vehicle as the first side of the vehicle when the direction of travel of the vehicle is backward.

13. The article of manufacture of claim 9 wherein the control signal is configured communicate a warning to the operator of the vehicle through an operator interface on the vehicle.

14. The article of manufacture of claim 9 wherein the control signal is configured to activate an advanced driver assistance system on the vehicle.

15. The article of manufacture of claim 14 wherein the advanced driver assistance system comprises an emergency braking system.

16. The article of manufacture of claim 9 wherein the condition comprises a distance between the object and the vehicle.

17. A method for suppressing or adjusting certain actions by a collision avoidance system of a vehicle, comprising:

identifying a first side of the vehicle containing a blind spot for an operator of the vehicle;

identifying a potential collision between the vehicle and an object in a path of travel of the vehicle responsive to a collision signal generated by a collision sensor;

determining a speed of the vehicle;

determining a trajectory of the vehicle; and suppressing generation of a control signal relating to the potential collision if the speed of the vehicle meets a first predetermined condition relative to a predetermined speed, the trajectory of the vehicle meets a second predetermined condition relative to a predetermined trajectory and the potential collision would occur on a second side of the vehicle opposite the first side of the vehicle, wherein the control signal assists or automates control of a braking system of the vehicle and/or steering system of the vehicle in response to detection of the potential collision.

18. The method of claim 17 wherein identifying the first side of the vehicle containing the blind spot includes determining a direction of travel of the vehicle.

19. The method of claim 18 wherein identifying the first side of the vehicle containing the blind spot includes classifying a passenger side of the vehicle as the first side of the vehicle when the direction of travel of the vehicle is forward.

20. The method of claim 18 wherein identifying the first side of the vehicle containing the blind spot includes classifying a side of the vehicle opposite a steering direction of the vehicle as the first side of the vehicle when the direction of travel of the vehicle is backward.

* * * * *